(12) United States Patent
Morelli (10) Patent No.: US 10,766,564 B2
(45) Date of Patent: Sep. 8, 2020

(54) PROTECTION DEVICE FOR DISC BRAKES

(71) Applicant: Angelo Morelli, Pontenure (IT)

(72) Inventor: Angelo Morelli, Pontenure (IT)

( * ) Notice: Subject to any disclaimer, the term of this patent is extended or adjusted under 35 U.S.C. 154(b) by 107 days.

(21) Appl. No.: 15/768,930

(22) PCT Filed: Oct. 25, 2016

(86) PCT No.: PCT/IB2016/001534
§ 371 (c)(1),
(2) Date: Apr. 17, 2018

(87) PCT Pub. No.: WO2017/072572
PCT Pub. Date: May 4, 2017

(65) Prior Publication Data
US 2019/0054975 A1 Feb. 21, 2019

(30) Foreign Application Priority Data
Oct. 26, 2015 (IT) .............................. UB2015A4919

(51) Int. Cl.
*B62L 1/00* (2006.01)
*B62J 23/00* (2006.01)

(52) U.S. Cl.
CPC ............... *B62L 1/005* (2013.01); *B62J 23/00* (2013.01); *B62L 1/00* (2013.01)

(58) Field of Classification Search
CPC .. B62L 1/005; B62L 1/00; B62J 23/00; B60B 27/0052; B60B 37/00; B60T 1/06; F16D 65/0081
USPC ...... 188/218 A, 218 R, 218 XL, 18 A, 18 R; 301/6.8, 6.9
See application file for complete search history.

(56) References Cited

U.S. PATENT DOCUMENTS

| 4,164,273 A | * | 8/1979 | McElroy | ................... B60T 1/06 |
|---|---|---|---|---|
| | | | | 188/218 A |
| 2016/0186822 A1 | * | 6/2016 | Koshiyama | ......... F16D 65/0081 |
| | | | | 301/6.8 |

FOREIGN PATENT DOCUMENTS

| CN | 2521138 Y | | 11/2002 |
|---|---|---|---|
| CN | 101875389 | | 3/2010 |
| EP | 1029803 A2 | | 8/2000 |
| GB | 2031081 A | | 4/1980 |
| JP | 59-205032 A | * | 11/1984 |
| JP | 60-67245 A | * | 4/1985 |
| JP | H0424491 B2 | | 1/1992 |

* cited by examiner

*Primary Examiner* — Pamela Rodriguez
(74) *Attorney, Agent, or Firm* — King & Schickli, PLLC

(57) ABSTRACT

A protection device (10, 10', 10") for disc brakes of velocipedes of the racing bike, mountain bike, city bike, electric pedal assisted cycle, and/or small motorcycle type, which comprises an interchangeable brake guard (12, 16, 18), secured to a wheel (20) of the velocipede, arrange coaxially to a disc (14) and featuring a basically "C"-like cross-sectional profile which comprises a front side (12', 16', 17) intended for covering a front surface of the disc (14), a rear side (12", 16", 17') intended for partially covering a rear surface of the disc in correspondence with a brake track which pads of a brake caliper (28) act on, and an intermediate side (12''', 16''', 17") intended for connecting the front side (12', 16', 17) and rear side (12", 16", 17') to each other and for covering a peripheral circumferential edge of the disc (14).

16 Claims, 7 Drawing Sheets

PROTECTION DEVICE FOR DISC BRAKES

TECCHNICAL FIELD

The present invention refers to a protection device for disc brakes.

BACKGROUND

More specifically, the present invention refers to a protection device for disc brakes in velocipedes of the bicycle type (racing bikes, mountain bikes, city bikes, electrical pedal assisted bikes, and the like) as well as small motorcycles or equivalent light vehicles equipped with disc braking systems.

It is known that a disc brake is a mechanical device suitable for slowing down and/or stopping the rotation of a wheel and consequently of the vehicle that it is rotatably constrained to.

Such device typically comprises a disc coaxially secured to the wheel and co-operating with a so-called "caliper" secured to the frame of the bike and, more specifically, to its respective fork.

The caliper is provided with a pair of pads made from a material suitable for generating friction onto the opposite surfaces of the disc, called "brake tracks".

The caliper is activated by the operation of appropriate levers, located on the handlebars of the velocipede, which control a mechanical or hydraulic system.

In a mechanical system, the caliper is controlled through the tensioning of a metal wire, whereas in a hydraulic system the caliper is controlled by a pressure generated in an oil-pressure circuit.

The discs of bikes, typically coaxially secured to the hub of the wheel, feature a diameter generally ranging from 120 to 180 mm (such values are typical to city bikes, whereas the discs of mountain bikes have basically greater diameters) with a thickness basically ranging from 1.8 to 2.0 mm and include a plurality of openings or through-holes the function of which is to lighten the disc and improve the dissipation of the heat generated by the friction of the pads onto said disc during a braking.

However, a braking system based on discs as described above presents a number of major drawbacks.

SUMMARY

Specifically, in the case of a racing bike, an important drawback consists in that the discs tend to rapidly overheat because of the friction generated by the pads whenever these ones press the brake tracks of the discs; as a matter of fact, the generated heat is as much greater as more intense is braking (for instance, when running downhill or turning or in the case of sudden brakings). Heat is dissipated efficiently whenever the wheel of a bike is moving (the openings through the discs just perform this function) and definitely less efficiently whenever a wheel of a bike is still.

As a consequence, whenever a wheel of a bike is stopped abruptly by a sudden braking and consequently the disc is very hot, or even red-hot, apparent are the hazards of even severe burnings for cyclists whose lower limbs, as well as other parts of the body, might get in contact with the surface of the disc in the case of a fall or in the case wherein it is necessary to replace a punctured or damaged wheel.

A further drawback of disc brakes consists in that the discs, being their thickness considerably small (basically ranging from 1.8 to 2.0 mm), have their outer peripheral edges and the edges of the through openings extremely sharp; this entails major risks of cutting themselves both for cyclists and for technicians and/or mechanics who, in the course of sport competitions, deal with repairing and/or replacing bikes or wheels.

An increased hazard of even severe accidents results from that, during a sport competition, the replacement of a wheel is performed by the persons in charge without wearing gloves or others protection means; this because it is necessary to perform such operations rapidly and accurately and gloves might represent a hindrance while performing such operations, account being taken that during sports competitions delays of even few seconds in a wheel replacement operation might jeopardize the result of the sports competition itself.

Another drawback, occurring in particular in the case of racing bikes whose wheels are equipped with tubular tires featuring a thickness much thinner than that of city bikes or mounting bikes, is represented by the so-called "slicer effect". This effect, which people very much afraid of because of its always very dangerous consequences, occurs whenever racing cyclists run massed together in a peloton and the discs of one bike get in an even very slight contact with the tubular tire of another bike close thereto.

As a matter of fact, a brake disc turns at a high speed, its edges being extremely sharp and easy to overheat upon an ever very low friction, and causes an immediate tearing and a consequent blow-out of the tubular tire which it got in contact with.

A further drawback, which might quite easily occur in the course of a competition during which competitors are massed in a peloton, is related to the wide free space existing between the disc and the spokes of the wheel with respect which said disc is secured.

Such free space is necessary to make it possible to secure the braking caliper supporting the pads, but represents a so-called "trap" for the thin wheels of another bike (reference is still made to racing bikes) which, whilst not directly impacting the disc, might dangerously slip into said free space and cause a loss of control of the bike and a consequent fall of the cyclist.

A further problem of discs is in that they are made from materials that are very hard, hence not ductile nor elastic at all, hence they are fragile and, consequently, very sensitive to impacts. As a matter of fact, even minor impacts might generate stresses, even variable over time (in a regular or random manner), responsible for damaging the disc which might even get broken, for instance, because of the formation or expansion of a crack which, progressing in the material, might cause the material to get broken by fatigue, said stresses also being responsible for such permanent mechanical deformations or chippings in the discs as to jeopardize the parallelism or the perfect smoothness of the brake tracks and consequently to substantially reduce the braking efficiency of the discs themselves.

An object of the present invention is to offer to cyclists and those in charge for maintenance and assistance of bikes equipped with a disc braking system, a tool capable of obviating the drawbacks described above and consequently substantially increasing the safety level.

A further object of the present invention is to provide a protection device for braking systems of the disc type mounted on any types of velocipede, suitable for preventing parts of the limbs of cyclists, technicians and/or persons that operate on bikes or on wheels from burning themselves (because of the heat developed on the disc during a braking) or from cutting themselves (because of the sharp edges of the discs themselves).

A further object of the present invention is to prevent the above discussed "slicer" and "trap" effects.

A further object of the present invention is to provide a protection device for braking systems of the "disc" type suitable for preventing impacts or abrasions of the disc which might generate stresses responsible for mechanical deformations and/or chippings of such discs; therefore, an object of this device is to safeguard the good quality, efficiency, and lifetime of a braking system both in the case of a wheel mounted on a bike and in the case of a wheel dismantled in order to perform, for instance, maintenance or storage operations or the like.

A further object of the present invention is to put at users' disposal a protection device for discs of disc braking systems, that allows to retain the good quality of the braking, the efficiency, and the lifetime of the discs, of the pads and, consequently, of the braking system as a whole, while guaranteeing a high efficiency and reliability degree over time; furthermore, the device is such that it can be easily and economically implemented.

These objects and others are achieved by the invention that features the characteristics according to claim 1. According to the invention, a protection device for disc brakes is provided for velocipedes of the racing bike, mountain bike, city bike, electric pedal assisted cycle and/or small motorcycle types, which comprises an interchangeable brake guard, secured to a wheel of the velocipede, arranged coaxially to a disc and having a basically "C"-like cross-sectional profile which comprises a front side intended for covering a front surface of the disc, a rear side intended for partially covering a rear surface of the disc in correspondence with a brake track which pads of a brake caliper act on, and an intermediate side connecting said front side and rear side and intended for covering a peripheral circumferential edge of the disc. Advantageous embodiments of the invention are apparent from the dependent claims.

BRIEF DESCRIPTIN OF THE DRAWING FIGURES

The mechanical and functional characteristics of the protection device for discs for disc braking systems of the present invention can be better understood from the detailed description which follows, wherein reference is made to the attached drawings which represent a preferred, not limitative, embodiment and wherein.

DETAILED DESCRIPTION OF THE INVENTION

Figure 1:
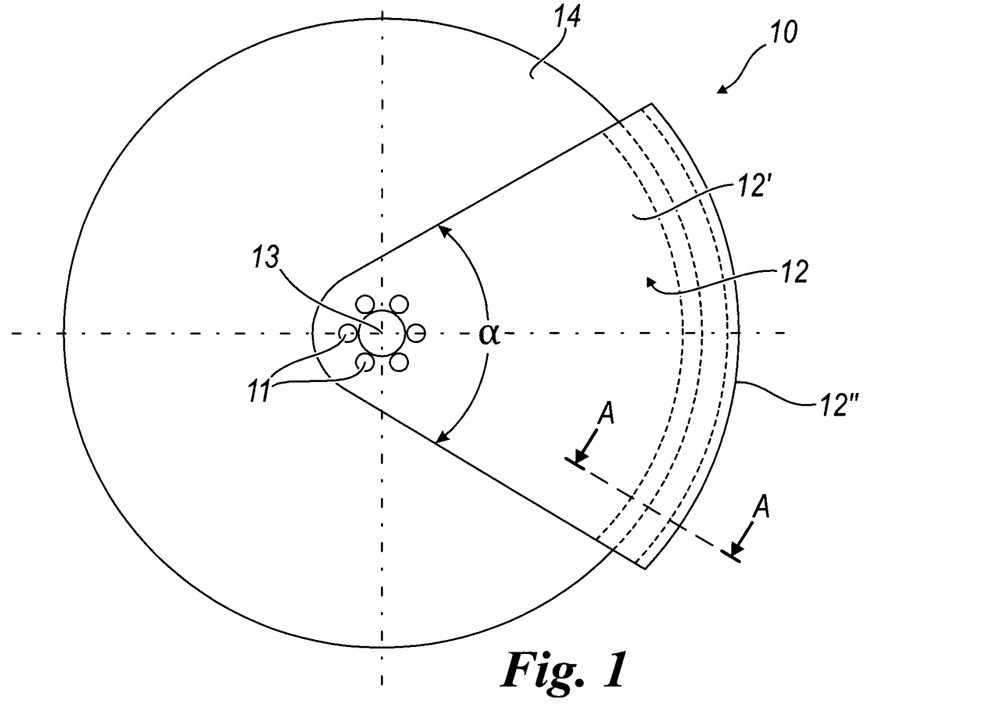
FIG. 1 schematically shows a top view of a protection device for discs for disc braking systems of the present invention according to a first embodiment.
Figure 2:
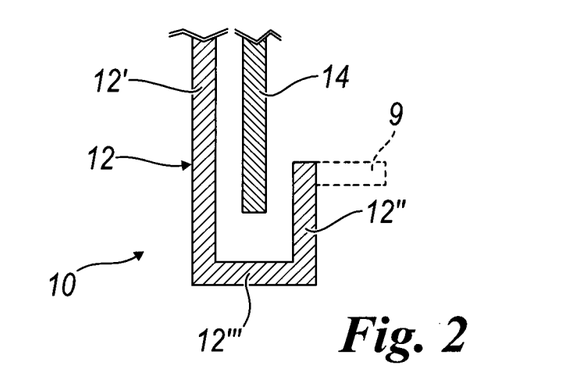
FIG. 2 schematically shows a cross-sectional view of the protection device of FIG. 1 according to a sectional plane indicated by A-A in FIG. 1.

With reference to FIGS. 1 and 2, the protection device for disc brakes according to the present invention, identified by the reference numeral 10 as a whole, comprises a brake guard 12 coaxially secured to a disc 14 by way of screws 11 or equivalent and known mechanical retention means and features a sector-of-a-circle development, with an opening angle alpha ($\alpha$), basically ranging from 45° to 180° and preferably ranging from 110° and 120°, so as to implement a partial coverage of the disc 14.

The brake guard 12 is provided with a central hole or opening 13 suitable for allowing, as detailed below, for securing it with respect to an axle of the hub of the wheel of the bike; such hole or opening can have a circular or square shape to make it possible for a quick coupling with respect to the mentioned axle and, at the same time, for guaranteeing an anti-rotation of the brake guard with respect to the axle.

Said brake guard 12, as schematically shown in the cross-sectional view of FIG. 2, features a basically "C"-shaped cross-sectional profile with a front side 12' intended for covering the front surface of the disc 14 facing the frame of the bike, a rear side 12" intended for partially covering the rear surface of the disc, and an intermediate side 12''' connecting said front side 12' and rear side 12" to each other and covering the outer peripheral circumferential edge of the disc.

Said rear side 12", in accordance with an alternative configuration, can be provided with a projecting appendage 9 (indicated by a broken line in FIG. 2) preferably, but not exclusively, developing according to a direction substantially perpendicular to the rear surface of the disc and facing the direction of the wheel of the bike, so as to perform a partial coverage of the surface of the disc and, at the same time, a closing of the gap existing between the disc and the wheel.

Figure 3:
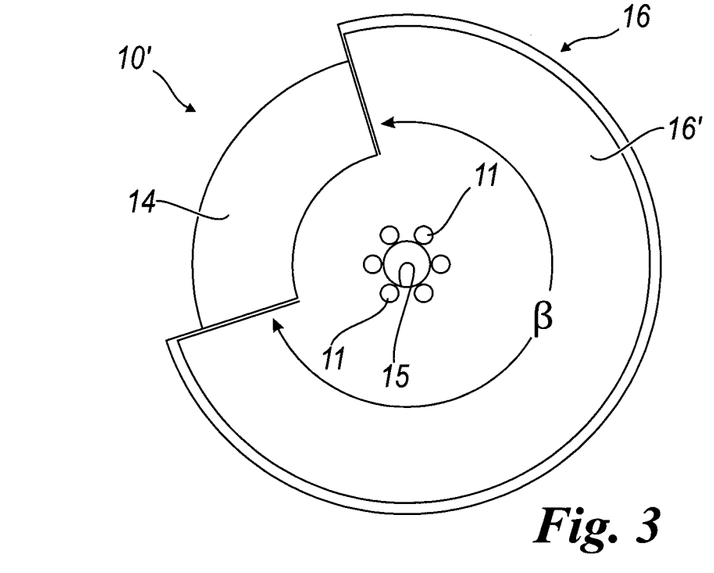
FIG. 3 schematically shows a top view of the protection device of the invention according to a second alternative embodiment.
Figure 3A:
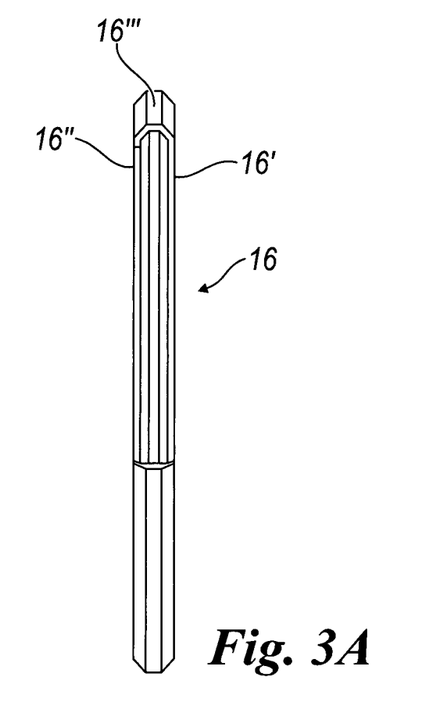
FIG. 3A schematically shows a partially cross-sectional side view of the protection device according to the embodiment of FIG. 3.

With reference to FIGS. 3 and 3A, the disc (14) protection device, indicated by the reference numeral 10' as a whole, comprises a brake guard 16, featuring a preferably but not exclusively disc-like shape, coaxially secured to said disc 14 and featuring a sector-of-a-circle development with an angle beta ($\beta$) basically ranging from 270° to 320°.

The absent portion of the brake guard, corresponding to a sector-of-a-circle of an angle gamma (γ) complementary to the angle beta, is suitable for accommodating the overall dimensions of the brake caliper constrained to the frame and consequently the amplitude of the angle gamma fits the dimensions of the various models of caliper to be accommodated.

Therefore, the wheel having been mounted, and the brake guard 16 being correctly positioned under the lee of the caliper, a substantially total protection of the disc 14 is achieved.

Said brake guard 16 includes a central opening 15 suitable for allowing to secure it with respect to an axle of the hub of the wheel of the bike by way of screws 11 or equivalent and known retention means; in the embodiment according to FIG. 3, such opening 15 features a curvilinear profile, however it might also feature a profile having a different shape (for instance, quadrangular) in order to define an anti-rotation constraint with respect to said axle of the hub of the wheel.

The brake guard 16 features, as in the case of the first embodiment 10 described above, a substantially "C"-shaped cross-sectional profile comprising a front side 16' intended for covering the front surface of the disc 14 facing the frame of the bike, a rear side 16" intended for partially covering the rear surface of the disc, and an intermediate side 16''' intended for connecting said front side 16' and rear side 16" to each other, and for covering the outer peripheral circumferential edge of the disc 14; as with the embodiment of FIGS. 1 and 2, the rear side 16" might even be shaped so as to realize a partial coverage of the surface of the disc and, at the same time, a closing of the gap existing between the disc and the wheel.

Figure 4:
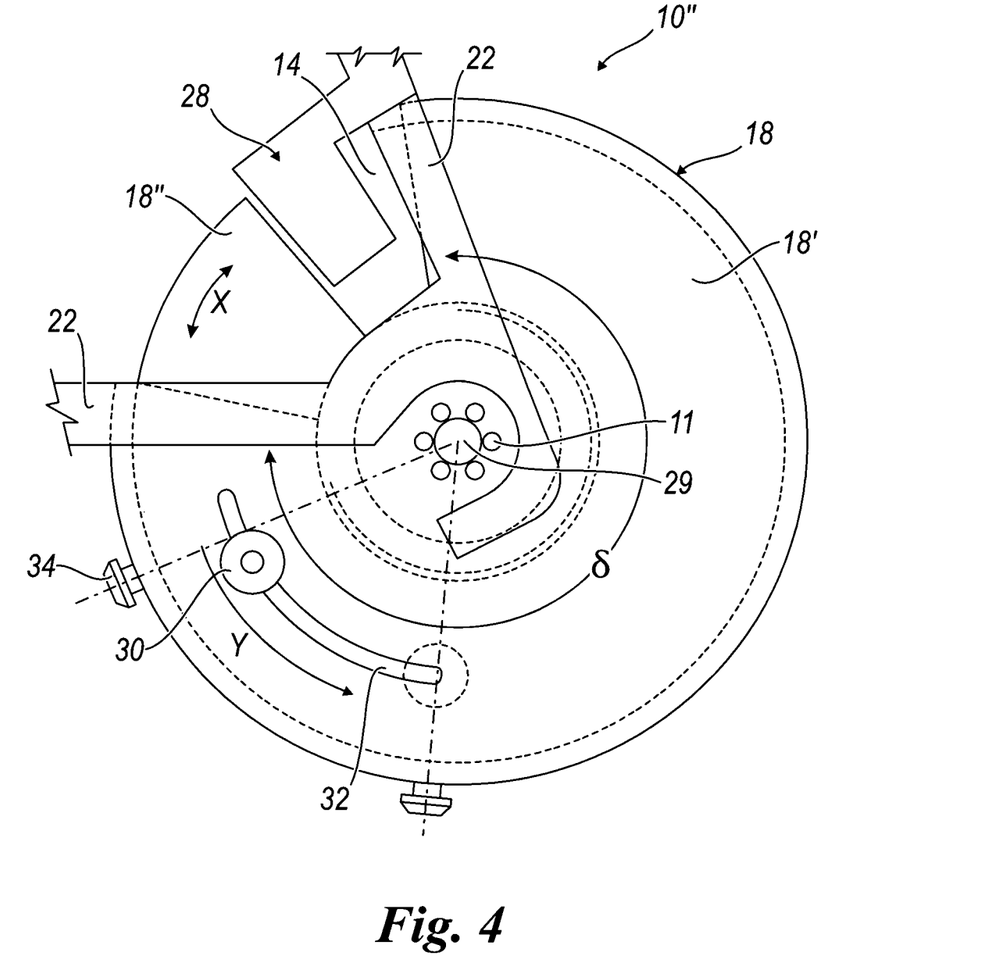
FIG. 4 schematically shows a top view of the protection device of the invention according to a third alternative embodiment.

FIG. 4 schematically shows a further and more complete embodiment of the brake guard, identified by the reference numeral 10" as a whole, capable of perfectly protecting the disc 14 even when the wheel is not mounted on the bike. More specifically, the protection device 10" comprises a brake guard 18 secured, as detailed below, to the wheel 20 (as schematically shown in FIG. 5) which is in turn constrained to the fork 22 of the frame of the bike or velocipede.

For this purpose, the brake guard 18 is provided with a central hole or opening 29 suitable for allowing to secure it with respect to the axle of the hub of the wheel; such opening 29 might even feature a shape different from that of FIG. 4 (for instance a quadrangular shape) to define an anti-rotational coupling or constraint with the axle of said hub.

The brake guard 18 comprises a first portion 18' coaxial to the disc 14 and secured to the wheel 20 by way of screws 11 or equivalent mechanical retention means and suitable for implementing a partial coverage of the disc 14 and featuring a sector-of-a-circle development with an angle delta (σ) basically ranging from 270° to 320° and a second portion 18" defined by a sector-of-a-circle coaxial and slidable internally to said first portion 18' as better detailed below.

Figure 5:
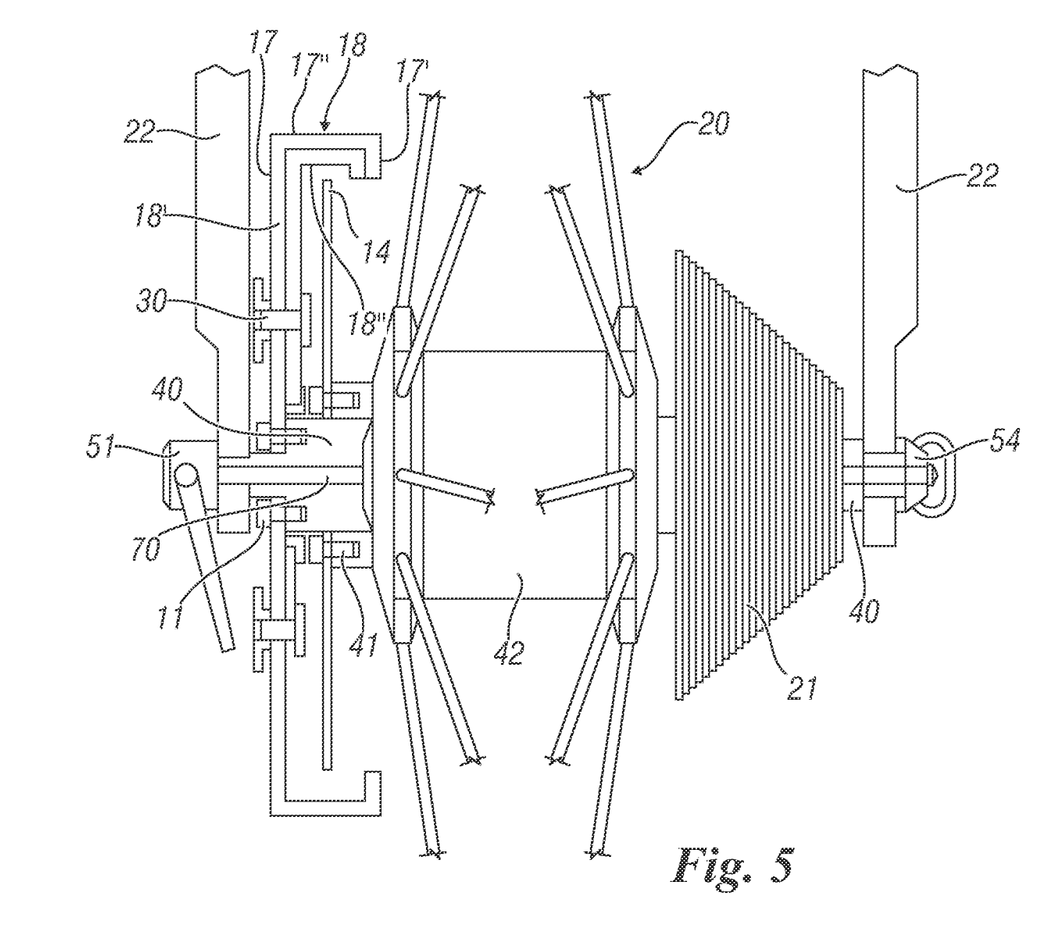
FIG. 5 schematically shows a partially cross-sectional side view according to a transversal vertical plane of a portion of a fork of a bike or a small motorcycle equipped with a wheel which a disc brake is secured to provided with a protection device according to the invention.

The first portion 18' and the second portion 18" of the brake guard 18 feature a "C"-like cross-sectional shape so as to partially surround the disc 14 as schematically shown in FIG. 5; specifically, the first portion 18' comprises a front side 17 intended for covering the front surface of the disc 14 facing the frame of the bike, a rear side 17' intended for partially covering the rear surface of the disc, and an intermediate side 17" intended for connecting said front side 17 and rear side 17' to each other and for covering the outer peripheral circumferential edge of the disc 14; as described before with reference to the first and second embodiments, the rear side 17' can be so shaped as to also realize, besides a partial coverage of the surface of the disc, a coverage of the gap existing between the disc and the wheel.

The second portion 18" of the brake guard 18 defines a movable door which slides internally to the shape of the first portion 18' in the sense indicated by the arrow X in FIG. 4.

Whenever the wheel is dismantled from the bike, the second portion 18", completely withdrawn with respect the first portion 18' of the brake guard 18, makes it possible a total coverage and protection of the disc.

Whenever the wheel is mounted on the bike, the second portion 18", slidable internally to the outline of the first portion 18', makes it possible to uncover a portion of the disc 14 substantially corresponding to the overall dimensions of the brake caliper so as to enable said caliper to act onto said portion of the disc (the brake caliper is identified by the numeral 28 in FIG. 4).

The movement and the locking of the second portion 18" with respect to the first portion 18' is actuated by means of a threaded pawl 30 secured to said second portion 18" and slidable (according to the direction identified by the arrow Y in FIG. 4) in a slot or opening 32 cut in the front surface of said first portion 18' facing the fork 22 of the frame.

According to an alternative configuration, such movement of the second portion 18" with respect to the first portion 18' can be actuated by means of a threaded pawl 34 slidable in a slot (not represented in FIGS. 4 and 5) cut along the perimetric edge or band of the first portion 18' that covers the peripheral circumferential edge of the disc 14 (such movement also takes place along a direction identified by the arrow Y in FIG. 4).

In a further alternative configuration, in order to actuate the sliding movement of the second portion 18" with respect to the first portion 18' of the brake guard 18 (i.e. to make the second portion come back to or go out of the first portion) an elastic element such as a spring (for instance, a compression spring) or the like can be used to actuate an elastic recall action aiming at controlling the coming out of the second portion 18" with respect to the first portion of the brake guard in a full-coverage condition (when the wheel is dismantled with respect to the frame of the bike) or in a partial coverage one (when the wheel is mounted on the frame of the bike, said second portion abutting in contact to or in correspondence with the brake caliper) of the disc 14.

Therefore, the positioning of the brake guard takes place, the second portion 18" being fully back into the outline of the first portion 18' so as to accommodate the caliper in the absent part of the screen.

Having positioned the screen with respect to the caliper, the second portion 18" can be withdrawn from the outline of the first portion 18' and made slide substantially under the lee of the caliper 28 as a function of the dimensions and of the characteristics of the caliper itself and locked by means of the pawl 30 or 34 or equivalent retention means or by means of an elastic action exerted by a spring.

When the wheel 20 is dismantled from the bike, the second portion 18" is completely out with respect to the first portion 18' so as to completely cover the surface of the disc 14 thus implementing a total protection thereof.

Figure 6:
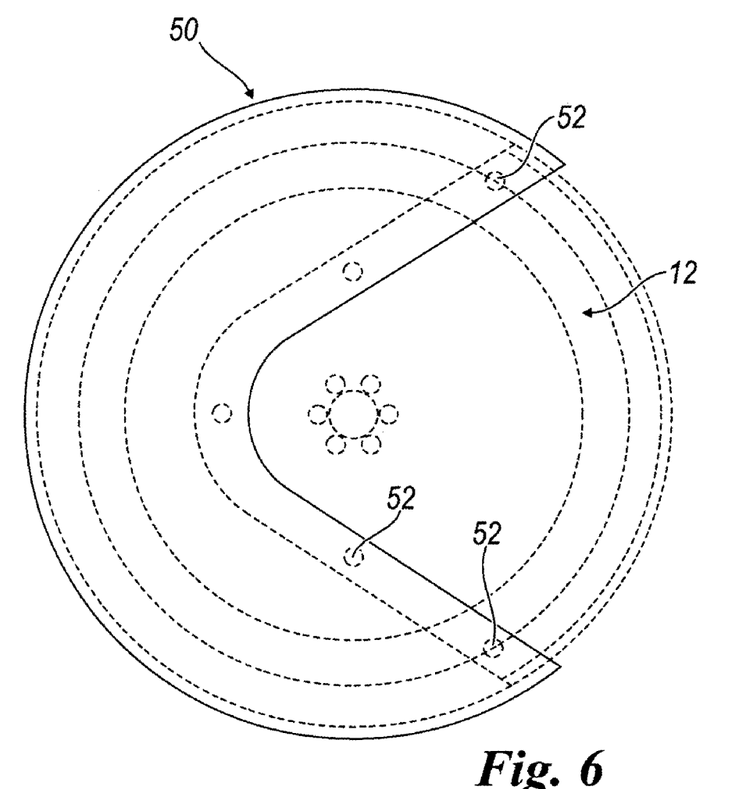
FIG. 6 schematically shows a top view of an accessory element usable in conjunction with the protection device for discs for disc braking systems of the present invention according to the first embodiment of FIG. 1 (the protection device according to FIG. 1 is indicated by a broken line)
Figure 7:
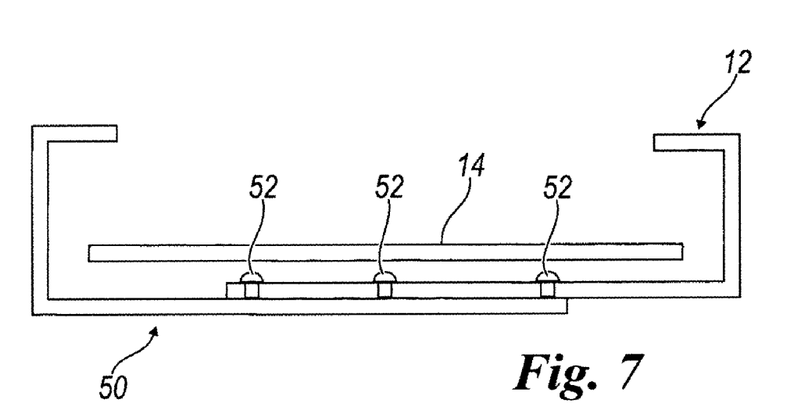
FIG. 7 schematically shows a cross-sectional view according to a diametrical plane in FIG. 6.

The brake guard realized in accordance with the first embodiment depicted in FIGS. 1 and 2 also possibly comprises a further brake guard 50 featuring a sector-of-a-circle development with an opening angle complementary to that of the brake guard 12 and such as to be applied to said brake guard 12 when the wheel is dismantled from the frame of the bike to implement a total coverage of the disc 14, as schematically shown in FIGS. 6 and 7.

The coupling between the brake guard 12 and the further brake guard 50 is implemented by way of means that allow for a coupling through a removable constraining action including, for instance, screws or dowels or strain constraint means of the bulge type 52 suitable for engaging corresponding seats formed in the brake guard 12 or small snap-in hooks or coupling means of the snap-fit type or the like.

Figure 8:
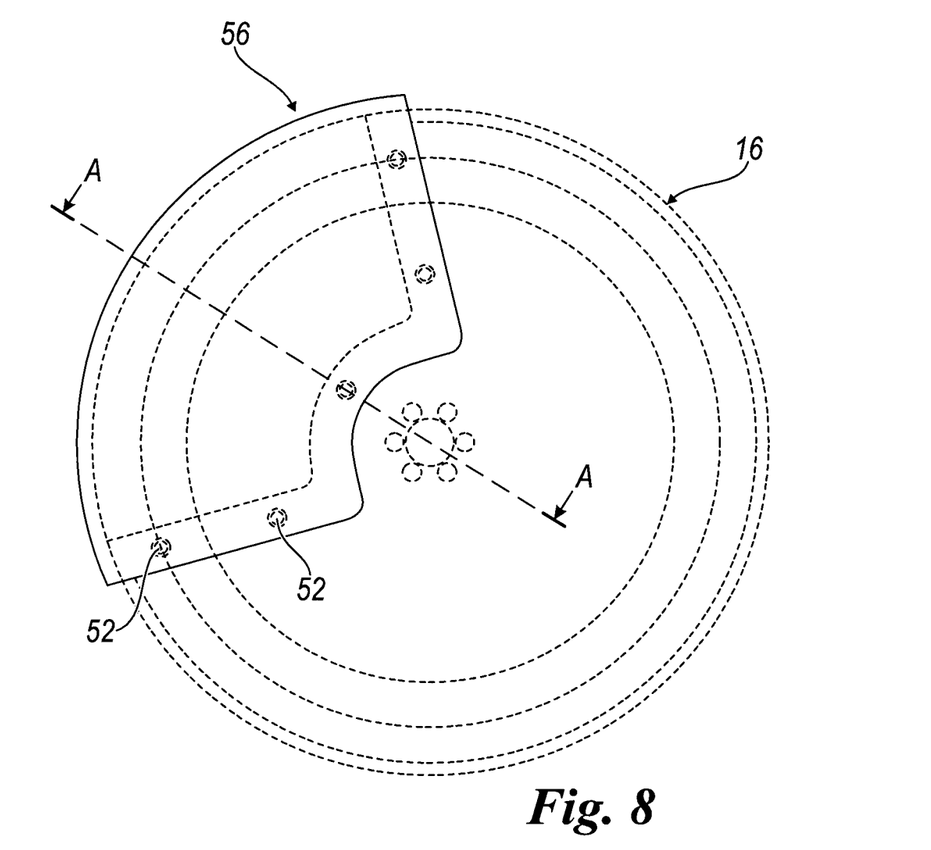
FIG. 8 schematically shows a top view of an accessory element usable in conjunction with the disc protection device according to the alternative embodiment of FIG. 3 (the protection device according to FIG. 3 is indicated by a broken line)
Figure 9:
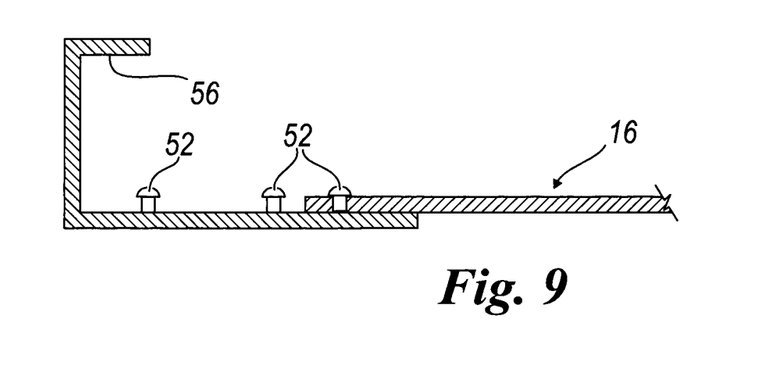
FIG. 9 schematically shows a cross-section according to the diametrical plane in FIG. 8.

With reference to FIGS. 8 and 9, they schematically show a further brake guard 56 possibly couplable with the brake guard 16, depicted in FIGS. 3 and 3A and suitable for implementing a complete coverage of the disc when the wheel is dismantled; the characteristics and the coupling and constraining modes of said further brake guard 56, if any, with respect to the brake guard 16 are not described in detail because already described before.

Said further brake guard (50 or 56), if any, is mounted on the brake guard that covers the disc 14 when the wheel is dismantled with respect to the frame of the bike and is removed whenever such wheel is mounted with respect to the frame of the bike to take account of the overall dimensions of the brake caliper.

With reference to FIG. 5, it depicts the securing mode of the protection device of the invention with respect to the rear wheel 20 of the bike provided with a pinion gear pack on which a transmission chain (not represented) is mounted.

Such FIG. 5 shows the securing mode of the protection device according to the third embodiment 10″; however, it goes without saying that such securing mode also applies to the first embodiment 10 and to the second embodiment 10′. The protection device is installed on the wheel 20 of the bike or velocipede and, in particular, it is secured (by means of the screws 11) to an end of the axle 40 contained in the hub 42 of the wheel 20, a hub that the disc 14 is secured to (by way of screws 41 o equivalent retention means), said hub 42 rotating free with respect to the axle 40.

According to an alternative embodiment, the protection device of the invention is secured to a flange (not shown in FIG. 5) rigidly stabilized to the axle 40 by means of a threading or an equivalent and known retention means, which advantageously allows to reduce the overall dimensions of the axle 40 itself.

Upon mounting the wheel 20, before locking the wheel itself to the frame, the brake guard 12, 16 or 18, secured to the axle 40, is positioned as a function of the position of the brake caliper 28, so as to accommodate it in the absent portion of the brake guard (as schematically shown, for instance, in FIG. 4).

Figure 10:
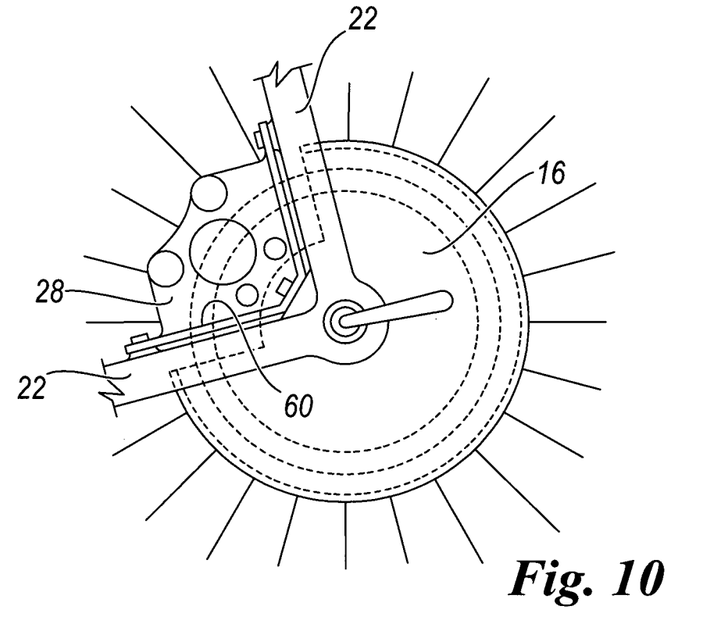
FIG. 10 shows the disc protection device according to the embodiment of FIG. 3, the brake caliper being mounted with respect to the fork according to an alternative embodiment.
Figure 11:
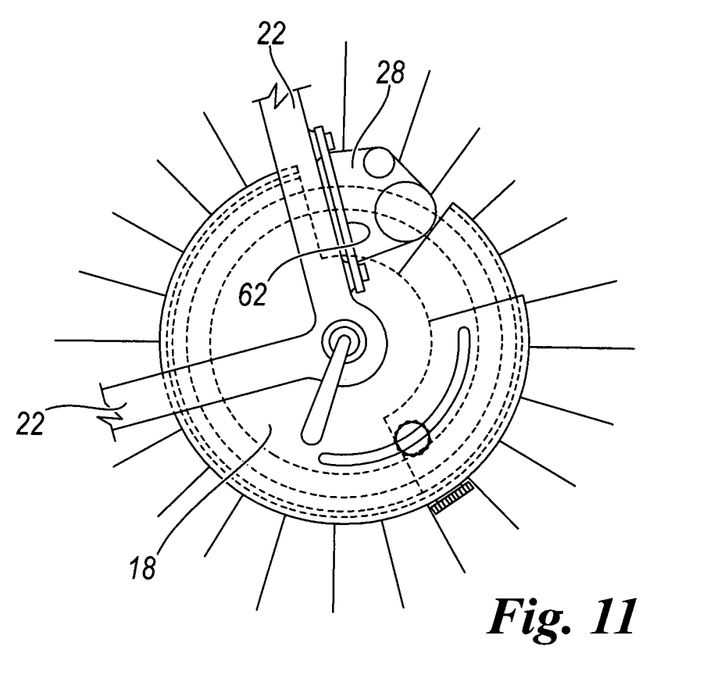
FIG. 11 shows the disc protection device according to the embodiment of FIG. 4, the brake caliper being mounted with respect to the fork according to a further alternative embodiment.

Said caliper 28 can be secured directly to the fork 22 of the frame (as schematically shown in FIG. 4) or indirectly via an interposed plate 60 or 62 secured to the fork 22 of the frame and with respect to which said caliper is secured (as schematically shown in FIGS. 10 and 11), being it possible to rigidly secure said plate to the caliper.

The wheel 20 is subsequently locked to the fork 22 of the frame by means of a tie-rod 70 provided, at one end, with a nut 54 and, at the opposed end, by means of a lever with eccentric 51 which, once operated, abuts to either fork thus tensioning the tie-rod 70 itself. Consequently, the axle 40, which the brake guard is secured to, is stably locked to the forks 22 of the frame thus holding the brake guard in its correct position. In some models of wheel, the locking system based on the tie-rod 70 and nut 54 elements is made up of one threaded tie-rod, not illustrated in the figures nor described here, being well known.

The protection device of the invention can be made from various, metal or plastic materials (aluminium or its alloys, PVC, and the like), from a carbon fiber or another material suitable for this purpose, as a function of the technological level to be achieved.

The advantages achieved by the device according to the invention are apparent from the previous discussion.

The protection device for disc brakes according to the present invention offers the advantage of keeping the disc repaired from the contact with water, dust, or other interfering elements such as, for instance, the limbs or clothes of those who use the bike or velocipede; this is achieved both when the wheel is mounted on the bike and when it is dismantled therefrom (for maintenance, replacement, storage purposes, etc.).

A further advantage is in that the brake guard guarantees a high safety level for those who use the two-wheeled vehicle, in that it prevents an accidental contact of the limbs or of other objects such that clothes, bags, dog leashes and the like; it also prevents contacts with the overheated surface and with the sharp edges of the disc (this applies both to bikes used in sports competitions and for normal city bikes, mountain bikes, or the like).

A further advantage is in that the device according to the invention, with a special reference to the discs mounted on racing bikes which, as everybody knows, feature a very reduced thickness and various sharp edges, prevents the so-called "slicer effect"; this effect, which racing cyclists are very much afraid of because of its always very dangerous consequences, occurs whenever, the competitors being massed together in the peloton, the discs of one bike get in an even very slight contact with the tubular tire of the wheel of another one close or adjacent thereto thus causing it to blow-out.

A further advantage is in that said protection device protects the disc from impacts or abrasions of the disc which might generate stresses responsible for mechanical deformations and/or chippings on said discs or indentations on the surfaces of the brake tracks, this way substantially jeopardizing the braking efficiency and a regular wear and tear of the pads, and also making abnormal stresses turn up, which might lead to a disc breakage.

A further advantage is in that the device according to the invention, while keeping the brake tracks of the disc permanently clean and perfectly smooth, guarantees a constant efficiency of the pads and an optimum braking quality.

A further advantage of the protection device according to the present invention is in that it allows to handle means equipped with a disc braking system in a fully safe manner; this is particularly felt and appreciated in the field of sports competitions where mechanics, in performing any operations onto the bikes or wheels of the racing cyclists cannot wear protecting gloves which, being thick, do not allow to perform such operations with the necessary accuracy and rapidity characteristics.

A further advantage is in that such protection device is interchangeable and easily replaceable without any need for dismantling the disc; as a matter of fact, such brake guard can be easily and rapidly replaced if worn or in order to vary the extent of coverage of the disc when the wheel is dismantled or as a function of the diameter of the disc, without any need for making modifications to the connection means or to the disc or the like.

A further advantage is in that the device according to the invention is economical and easy to implement.

Even though the invention has been described above with a special reference to a preferred embodiment thereof, provided for explanatory not limitative purposes only, numerous modifications and variants will be apparent to those skilled in this art in the light of the description disclosed above. Consequently, the present invention is construed to embrace all modifications and variants that fall within the scope of the following claims.

The invention claimed is:

1. A protection device (10, 10', 10") for disc brakes of velocipedes of the racing bike, mountain bike, city bike, electric pedal assisted cycle, and/or small motorcycle type, characterized in that it comprises an interchangeable brake guard (12, 16, 18), secured to a wheel (20) of the velocipede, arranged coaxially to a disc (14) and featuring a "C"-like cross-sectional profile which comprises a front side (12', 16', 17) for covering a front surface of the disc (14), a rear side (12", 16", 17') for partially covering a rear surface of the disc in correspondence with a brake track onto which pads of a brake caliper (28) act on, and an intermediate side (12''', 16''', 17") for connecting said front side (12', 16', 17) and rear side (12", 16", 17') to each other and for covering a peripheral circumferential edge of the disc (14), said brake guard (12, 16, 18) comprising a central opening or hole (13, 15, 29) shaped for a quick coupling and an anti-rotation of said brake guard with respect to an axle (40) of a hub (42) of the wheel (20) which the protection device is secured to.

2. The protection device according to claim 1, characterized in that the brake guard (12) features a sector-of-a-circle development with an opening alpha ($\alpha$) ranging from 45° to 180° for a partial coverage of the disc (14).

3. The device according to claim 2, characterized in that the protection device comprises a further brake guard (50, 56) featuring a sector-of-a-circle development with an opening angle complementary to that of the brake guard (12, 16) and such as to be applied to said brake guard (12, 16) whenever the wheel is dismantled from the frame of the bike to implement a total coverage of the disc (14).

4. The protection device according to claim 1, characterized in that the brake guard (16) features a sector-of-a-circle development with an opening angle beta ($\beta$) ranging from 270° to 320°.

5. The device according to claim 3, characterized in that the protection device comprises a further brake guard (50, 56) featuring a sector-of-a-circle development with an opening angle complementary to that of the brake guard (12, 16) and such as to be applied to said brake guard (12, 16) whenever the wheel is dismantled from the frame of the bike to implement a total coverage of the disc (14).

6. The protection device according to claim 1, characterized in that the brake guard (18) comprises a first portion (18') coaxial to the disc (14) suitable for realizing a partial coverage of the disc (14), and a second portion (18") defined by a sector-of-a-circle coaxial to said first portion (18') and slidable with respect to said first portion.

7. The protection device according to claim 6, characterized in that said second portion (18") defines a small door to close said brake guard (18) slidable by means of a threaded pawl (30) secured to said second portion (18") and slidable in a slot or opening (32) cut in the front side (17) of said first portion (18').

8. The protection device according to claim 7, characterized in that the second portion (18") is slidable with respect to said first portion (18') of said brake guard (18) by means of a threaded pawl (34) slidable in a slot cut along the intermediate side (17') of the first portion (18') which covers the peripheric circumferential edge of the brake disc (14).

9. The protection device according to claim 7, characterized in that the protection device comprises a spring co-operating with said second portion (18") to accompany the sliding movement of the second portion (18") with respect to the first portion (18') of the brake guard (18).

10. The protection device according to claim 6, characterized in that the second portion (18") is slidable with respect to said first portion (18') of said brake guard (18) by means of a threaded pawl (34) slidable in a slot cut along the intermediate side (17') of the first portion (18') which covers the peripheric circumferential edge of the brake disc (14).

11. The protection device according to claim 10, characterized in that the protection device comprises a spring co-operating with said second portion (18") to accompany the sliding movement of the second portion (18") with respect to the first portion (18') of the brake guard (18).

12. The protection device according to claim 6, characterized in that the protection device comprises a spring co-operating with said second portion (18") to accompany the sliding movement of the second portion (18") with respect to the first portion (18') of the brake guard (18).

13. The device according to claim 1, characterized in that it comprises a further brake guard (50, 56) featuring a sector-of-a-circle development with an opening angle complementary to that of the brake guard (12, 16) and such as to be applied to said brake guard (12, 16) whenever the wheel is dismantled from the frame of the bike to implement a total coverage of the disc (14).

14. The device according to claim 13, characterized in that the coupling between the brake guard (12, 16) and the further brake guard (50, 56) is implemented by way of coupling/retention means via a removable constraining action.

15. The protection device according to claim 1, characterized in that the brake guard (12, 16, 18) is rigidly secured to one end of the axle (40) contained in the hub (42) of the wheel (20) which the disc (14) is secured to, said hub (42) rotating free with respect to its respective axle (40).

16. The protection device according to claim 1, characterized in that the brake guard (12, 16, 18) is secured to a flange rigidly stabilized to the axle (40) by a threading.

* * * * *